(12) United States Patent
Nishimura et al.

(10) Patent No.: US 7,272,324 B2
(45) Date of Patent: Sep. 18, 2007

(54) EQUALIZATION OF OPTICAL SIGNALS

(75) Inventors: Ken A. Nishimura, Fremont, CA (US);
Brian E. Lemoff, Union City, CA (US);
Charles Hoke, Menlo Park, CA (US)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 662 days.

(21) Appl. No.: 10/007,531

(22) Filed: Oct. 26, 2001

(65) Prior Publication Data
US 2003/0081291 A1 May 1, 2003

(51) Int. Cl.
*H04B 10/00* (2006.01)
(52) U.S. Cl. .......................... 398/158; 398/159; 398/161
(58) Field of Classification Search ................ 398/1–9, 398/140–172
See application file for complete search history.

(56) References Cited

U.S. PATENT DOCUMENTS

| | | | |
|---|---|---|---|
| 3,988,614 A | 10/1976 | Kapron et al. | |
| 4,442,550 A * | 4/1984 | Killat | 398/202 |
| 5,375,004 A * | 12/1994 | Ogura | 398/53 |
| 5,555,119 A * | 9/1996 | Lewis | 398/161 |
| 5,822,100 A | 10/1998 | Robinson et al. | |
| 6,256,103 B1 * | 7/2001 | Sorin et al. | 356/484 |
| 6,271,952 B1 * | 8/2001 | Epworth | 398/147 |
| 6,708,003 B1 * | 3/2004 | Wickham et al. | 398/102 |
| 6,765,670 B2 * | 7/2004 | Olsson et al. | 356/327 |
| 2002/0024704 A1 * | 2/2002 | Erdogan et al. | 359/156 |

FOREIGN PATENT DOCUMENTS

| | | |
|---|---|---|
| DE | 2432718 A1 | 1/1976 |
| DE | 3212590 A1 | 10/1983 |
| EP | 1 217 765 A1 | 6/2002 |

* cited by examiner

*Primary Examiner*—Jason Chan
*Assistant Examiner*—David Lee

(57) ABSTRACT

Methods for performing time-domain equalization of an information signal represented by an optical signal are provided. A representative method includes: receiving the optical signal; optically splitting the optical signal into beams; optically delaying at least one of the beams; detecting a plurality of the beams to generate respective electrical signal components; and combining a plurality of the electrical signal components to generate an electrical output signal representing the information signal. Systems and other methods also are provided.

17 Claims, 10 Drawing Sheets

EQUALIZATION OF OPTICAL SIGNALS

FIELD OF THE INVENTION

The present invention generally relates to communications. More specifically, the invention relates to equalization of signals propagated via communications systems.

DESCRIPTION OF THE RELATED ART

Optical communication systems tend to offer greater capacity or "bandwidth" than entirely electrically-based communication systems. However, even current optical communication systems typically use electrical signals and light pulses to communicate information. In particular, transmit components of such an optical communication system convert electrical signals into light pulses. These light pulses are propagated via an optical circuit that defines one or more optical paths. Receive components communicating with the optical paths convert the light pulses back to electrical signals.

A representative optical communication system 100 is depicted schematically in FIG. 1. Optical communication system 100 generally includes an electrical domain 102 and an optical domain 104. Electrical domain 102 includes transmit components 106, e.g., laser diodes, and receive components 108, e.g., photodiodes. Optical circuit 110, which typically includes one or more optical fibers, propagates light pulses from transmit components 106 to receive components 108.

In an ideal case, a light pulse propagated via optical communication system 100 exhibits a square configuration, i.e., when intensity of the light pulse is plotted versus time, the plot depicts a generally square shape. However, since the pulse width of a light pulse typically is so small, e.g., 25–100 psec, distortions during pulse propagation typically result in the formation of non-ideal pulses. For instance, imperfections in optical fibers of the optical circuit can cause each pulse to spread from its square configuration. When such a non-ideal pulse is provided to receive components 108, non-ideal electrical signals can be generated. This can be problematic since non-ideal electrical signals can impair the reliability of the optical communication system, e.g., the error rate of the system can increase, particularly as bit rates in the optical communication system increase.

Methods to compensate for impulse response impairments in the electrical domain of an optical communication system are known. For example, it is known to pre-distort an electrical signal, i.e., modify the shape of the electrical signal before converting the signal to a light pulse, and provide a corresponding pre-distorted light pulse to the optical circuit. As the pre-distorted light pulse is propagated through the optical circuit, the physical properties of the optical circuit change the shape of the pulse so that the pulse provided to the receive components is closer to an ideal configuration.

Other methods of compensating for impulse response impairments in the electrical domain of an optical communication system also have been used. Typically, these methods include the use of electrical signal equalization. The optical communication system 100 of FIG. 2 incorporates an electronic equalizer 202 that is adapted to perform electrical signal equalization. In such a system, the optical signals are converted to electrical signals and then equalized by the electronic equalizer.

Prior-art communications have been rate limited, in part, due to the limits of precision of the incorporated equalization systems. What is needed is more precise equalization to provide for higher communication rates.

SUMMARY OF THE INVENTION

Systems and methods of the invention perform time-domain equalization of signals, at least partially, in the optical domain. In this manner, more precise delays can be introduced during equalization than achieved by conventional electrical equalization. Additionally, by optically introducing such delay, i.e., introducing the delay before the optical signal is converted to an electrical signal, transmission errors can be equalized before propagating farther downstream. By correcting the errors earlier, the errors may be less significant than if permitted to propagate farther before correction and, therefore, may be more effectively equalized.

Systems of the invention can perform equalization by receiving an optical signal, such as via an optical fiber of an optical communication system. The optical signal is then split into multiple beams, with at least one of the beams being optically delayed relative to the others. The beams, or electrical signal components corresponding to the beams, are then combined to produce an equalized output signal. In particular, by combining the beams (signals), the beams (signals) interfere with each other so that the output signal exhibits a more ideal shape compared to the received optical signal.

By way of example, a representative method for performing time-domain equalization of an information signal represented by an optical signal includes: receiving the optical signal; optically splitting the optical signal into beams; optically delaying at least one of the beams; detecting a plurality of the beams to generate respective electrical signal components; and summing a plurality of the electrical signal components to generate an electrical output signal representing the information signal. In some of these embodiments, the detecting is performed before the scaling. Additionally, some embodiments include scaling at least one of the signals (e.g., beams). This scaling can be performed electrically or optically.

A representative system for performing time-domain equalization of an information signal represented by an optical signal includes a beamsplitter, a delay component, an array of photodetectors and an amplifier. The beamsplitter is adapted to split the optical signal optically into beams. The delay component, which optically communicates with the beamsplitter, is configured to receive at least one of the beams and delay the at least one of the beams optically. The array of photodetectors is arranged to receive the at least one of the beams and is adapted to generate respective electrical signal components corresponding to the at least one of the beams. The amplifier is arranged to receive the electrical signal components and is adapted to generate an electrical output signal representing the information signal.

Clearly, some embodiments of the invention may exhibit advantages in addition to, or in lieu of, those described above. Additionally, other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Optical systems of the present invention compensate for at least a portion of the impulse response impairments typically evident in optical circuits. This is achieved by incorporating one or more equalization systems that are adapted to equalize signals propagated via such optical circuits. As will be described in greater detail, equalization is achieved, at least in part, in the optical domain.

Figure 1:
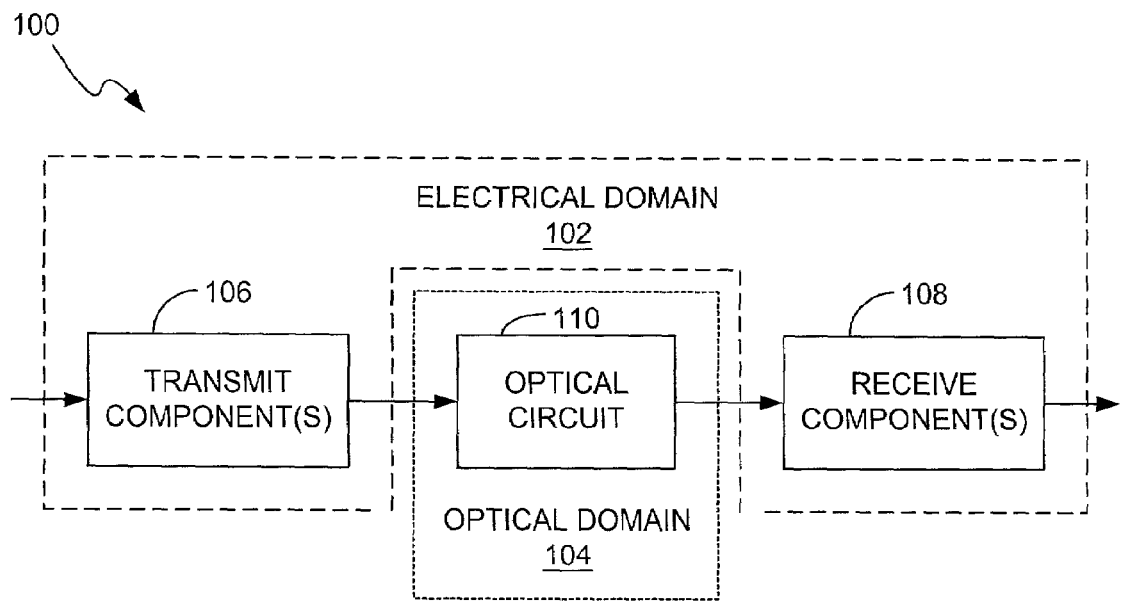
FIG. 1 is a schematic diagram of a representative optical communication system of the prior art.
Figure 2:
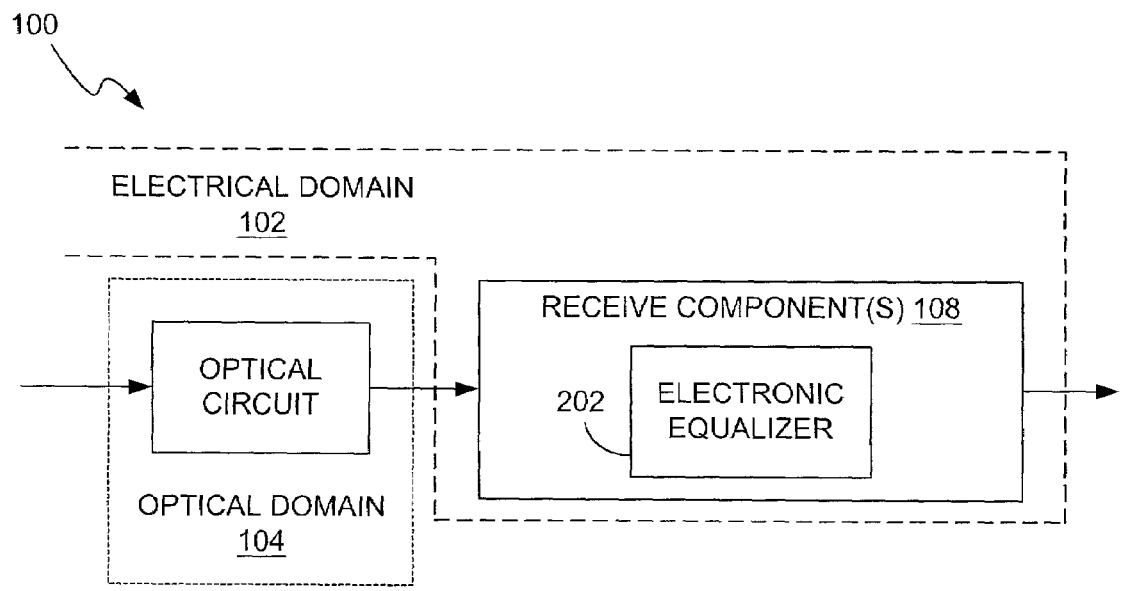
FIG. 2 is a schematic diagram of the optical communication system of FIG. 1 showing detail of the receive components.
Figure 3:
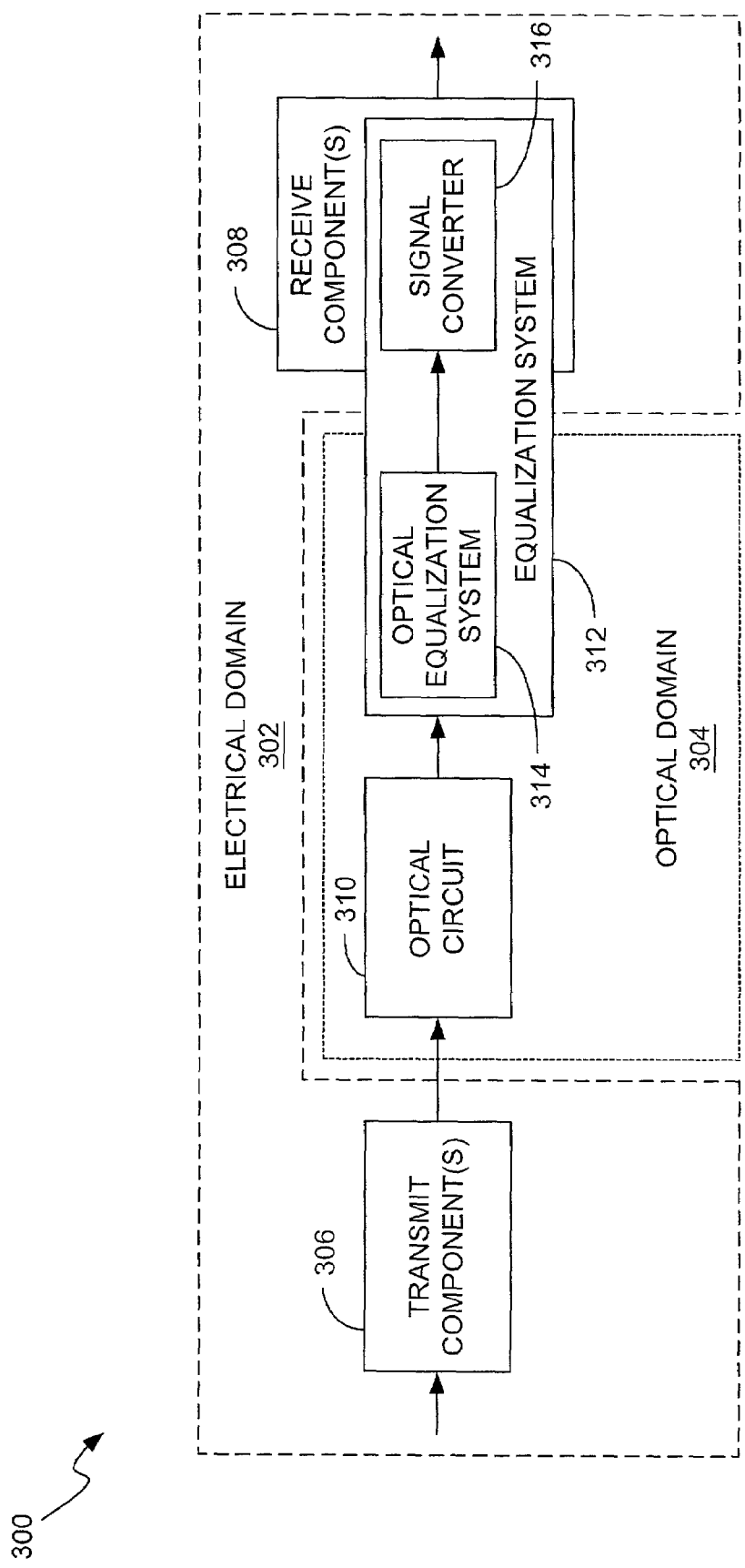
FIG. 3 is a schematic diagram depicting an embodiment of the optical system of the present invention.

Referring again to the drawings, FIG. 3 schematically depicts an optical system 300 of the present invention. As shown in FIG. 3, optical system 300 defines an electrical domain 302 and an optical domain 304. Electrical domain 302 includes transmit components 306 and receive components 308. Transmit components 306 convert electrical signals into optical signals (pulses). Transmit components 306 provide the optical signals to optical circuit 310, which is associated with the optical domain.

Optical system 300 also includes an equalization system 312 that receives the optical signals from optical circuit 310. Equalization system incorporates an optical equalization system 314 and a signal converter 316. The optical equalization system modifies the optical signals and provides the modified optical signals to signal converter 316. Signal converter 316, which can be considered one of the receive components, converts the modified optical signals to electrical signals. Receive components 308 then propagate the electrical signals to other components (not shown) of the optical system.

Figure 4:
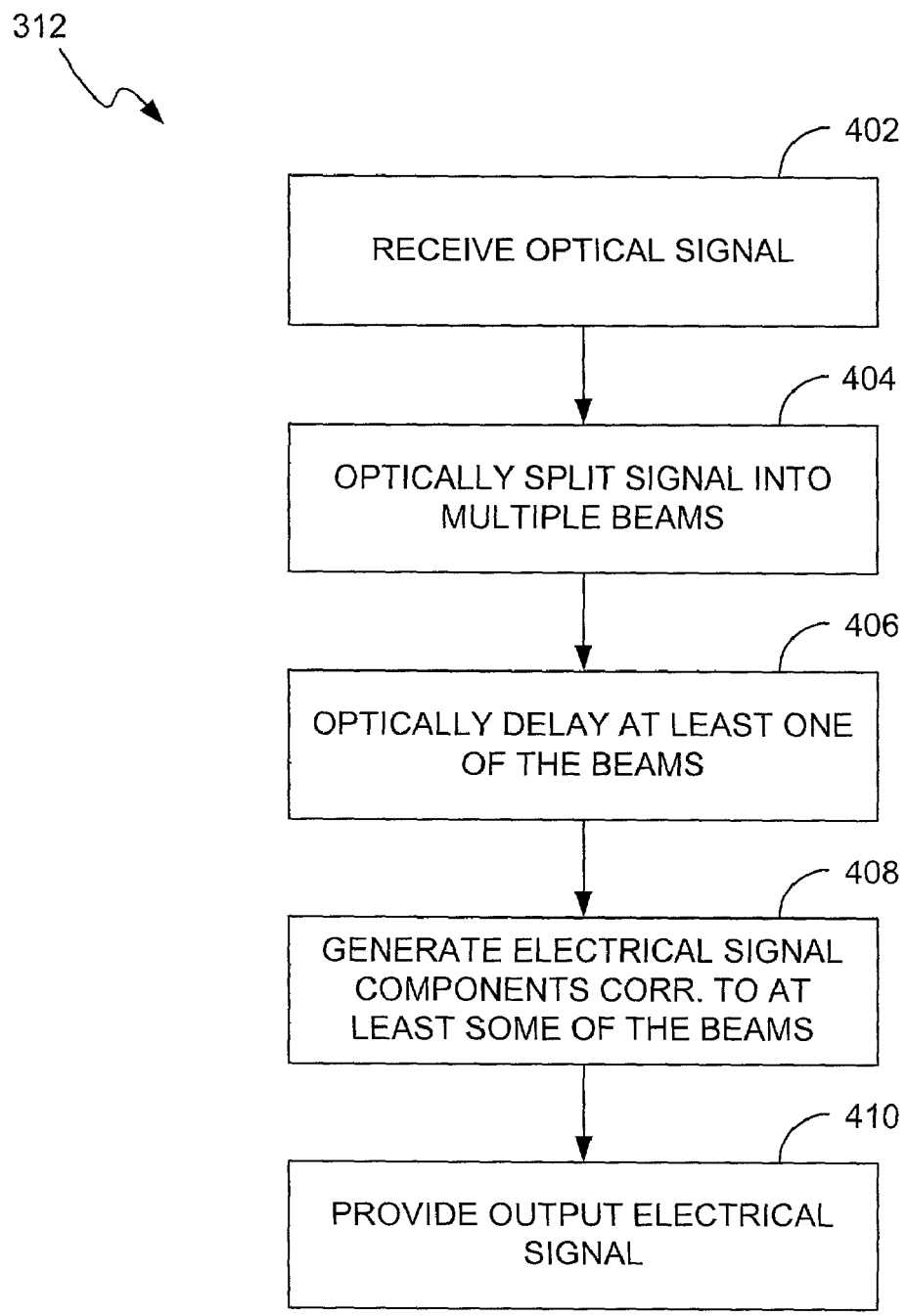
FIG. 4 is a flowchart depicting functionality of an embodiment of the equalization system of FIG. 3.

Reference will now be made to the flowchart of FIG. 4, which depicts the functionality of an embodiment of equalization system 312. It should be noted that in some alternative implementations, the functions noted in various blocks of FIG. 4 or any other of the accompanying flowcharts may occur out of the order in which they are depicted. For example, the respective functions of two blocks shown in succession in FIG. 4 may, in fact, be performed substantially concurrently. In other embodiments, the respective functions may be performed in the reverse order.

Referring now to the flowchart of FIG. 4, functionality of an embodiment of the equalization system 312 will be described. As depicted in FIG. 4, functionality of the equalization system (or method) may be construed as beginning at block 402 where an optical signal is received. In block 404, the optical signal is split optically into multiple beams. Preferably, each of the multiple beams is a copy of the optical signal. Thereafter, such as depicted in block 406, at least one of the beams is delayed relative to the optical signal. For example, in some embodiments, all but one of the multiple beams can be delayed relative to the optical signal. Note, the operations depicted in blocks 402–406 are preferably performed by optical equalization system 314 and, thus, are performed within the optical domain.

Proceeding to block 408, electrical signal components corresponding to at least some of the beams are generated. Thereafter, such as depicted in block 410, an output electrical signal corresponding to the optical signal is provided. In some embodiments, the output electrical signal is formed by combining, e.g., summing, the electrical signal components. In this manner, signal components corresponding to the impulse response impairments of the received optical signal interfere with other signal components resulting in an output signal that exhibits a more ideal shape than the received optical signal. Note, in some embodiments, scaling of at least one of the beams and/or electrical signal components can be performed. For example, at least one of the beams can be optically scaled prior to being converted to a corresponding electrical signal component(s). Alternatively, at least one of the electrical signal components can be electrically scaled.

Figure 5:
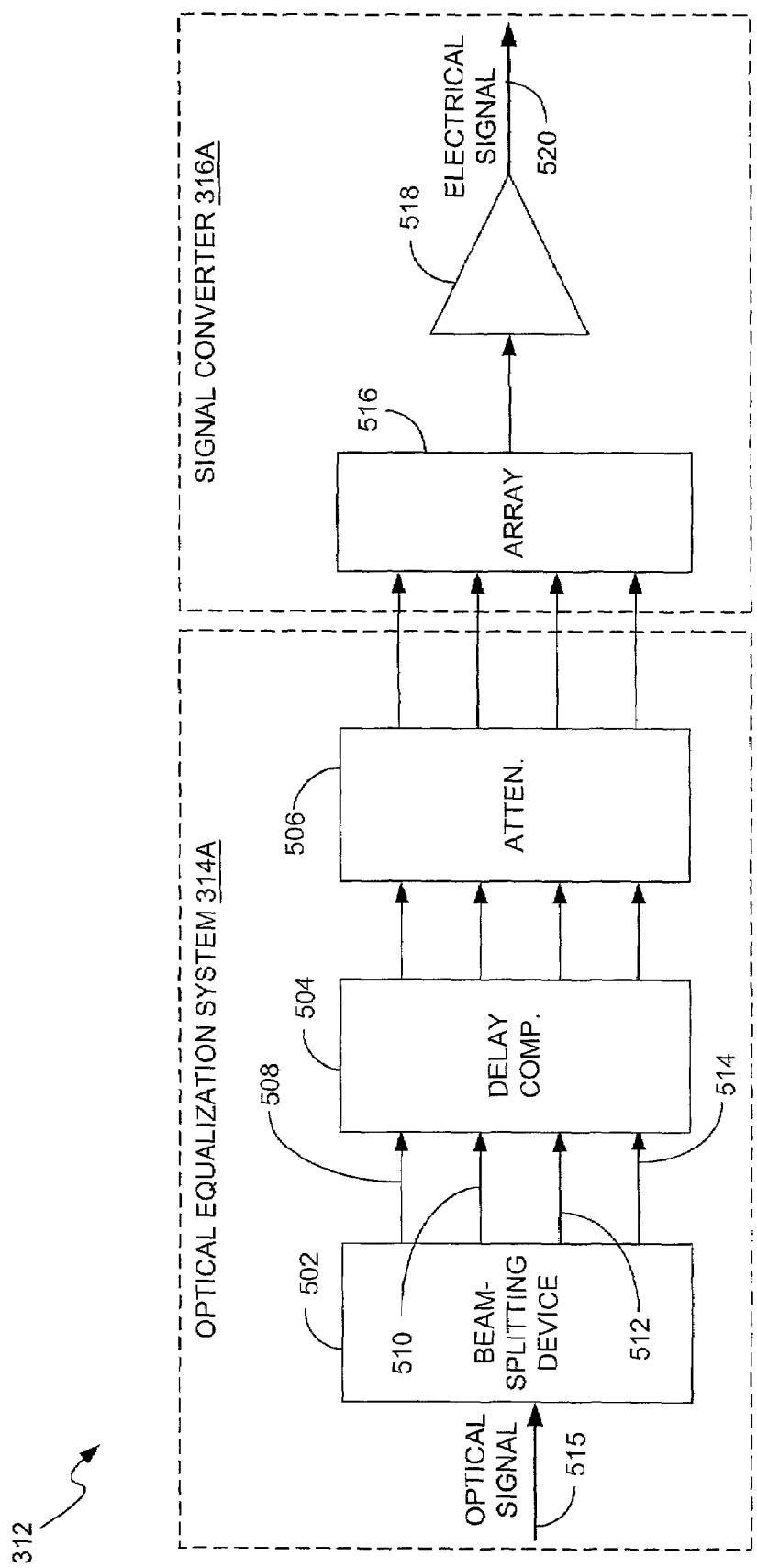
FIG. 5 is a schematic diagram depicting an embodiment of the equalization system of FIG. 3.

A first embodiment of equalization system 312 is depicted in FIG. 5. As shown in FIG. 5, equalization system 312 includes an optical equalization system 314A and a signal converter 316A. Optical equalization system 314A incorporates a beamsplitting device (or "beamsplitter") 502, a delay component 504 and an attenuator 506. The beamsplitting device, delay component and attenuator optically communicate to provide multiple beams to the signal converter. In particular, beamsplitting device 502 produces beams 508, 510, 512, and 514 in response to receiving an input optical signal (represented by arrow 515). In some embodiments, each of the beams is a copy of the input optical signal. It should be noted that although four beams are depicted in FIG. 5, various other numbers of beams can be used.

Beamsplitting device 502 provides beams 508, 510, 512, and 514 to delay component 504. Preferably, delay component 504 differentially delays each of the beams and then provides the beams to attenuator 506. Attenuator 506 then optically scales the beams. For instance, the attenuator, which is able to provide gains of 0 to +1, can selectively provide a fixed attenuation to each of the beams. Attenuation typically differs among the beams. In particular, at least one of the beams is scaled relative to the others.

After scaling by the attenuator, each beam is provided to signal converter 316A. More specifically, each of the beams is detected by a photodetector of array 516. An amplifier 518 receives the output electrical components of the photodetectors and then provides an output electrical signal 520 that corresponds to the input optical signal.

Figure 6:
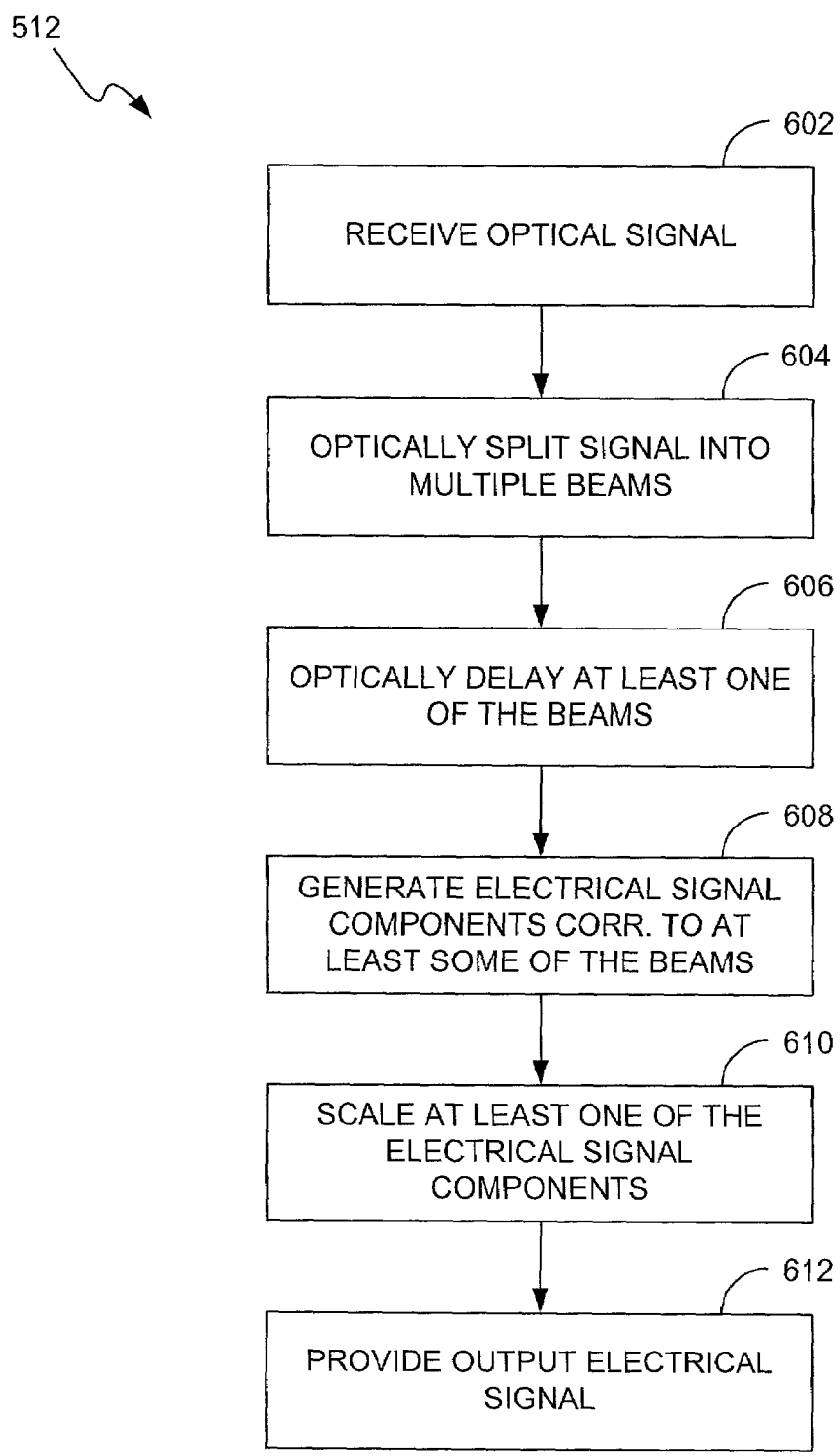
FIG. 6 is a flowchart depicting functionality of an embodiment of the equalization system of FIG. 3.

Referring now to the flowchart of FIG. 6, functionality of another embodiment of the equalization system 312 will be described. As depicted in FIG. 6, functionality of the equalization system (or method) may be construed as beginning at block 602 where an optical signal is received. In block 604, the optical signal is split optically into multiple beams. Preferably, each of the multiple beams is a copy of the optical signal. Thereafter, such as depicted in block 606, at least one of the beams is delayed relative to the optical signal. For example, in some embodiments, all but one of the multiple beams can be delayed relative to the optical signal. Note, the operations depicted in blocks 602–606 are preferably performed by optical equalization system 314 and, thus, are performed within the optical domain.

Proceeding to block 608, electrical signal components corresponding to at least some of the beams are generated. In block 610, at least one of the beams is scaled electrically. Thereafter, such as depicted in block 612, an output electrical signal corresponding to the optical signal is provided. In some embodiments, the output electrical signal is formed by summing the electrical signal components.

Figure 7:
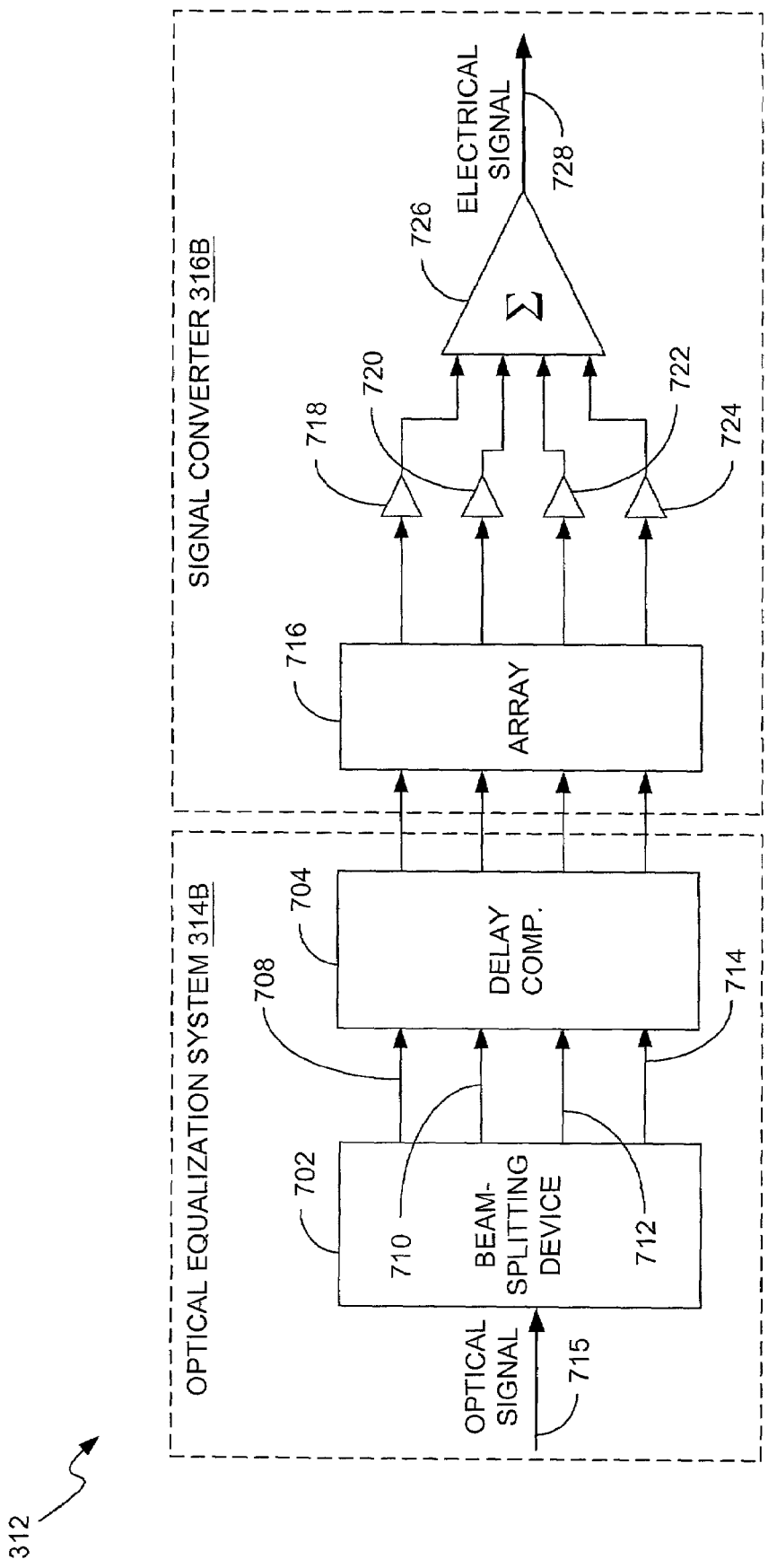
FIG. 7 is a schematic diagram depicting another embodiment of the equalization of FIG. 3.

A second embodiment of equalization system 312 is depicted in FIG. 7. As shown in FIG. 7, equalization system 312 includes an optical equalization system 314B and a signal converter 316B. Optical equalization system 314B incorporates a beamsplitting device 702, a delay component 704 and an array of photodetectors 716. The beamsplitting device and delay component optically communicate to provide multiple beams to the signal converter. In particular, beamsplitting device 702 produces beams 708, 710, 712, and 714 in response to receiving an input optical signal (represented by arrow 715). In some embodiments, each of the beams is a copy of the input optical signal. It should be noted that although four beams are depicted in FIG. 7, various other numbers of beams can be used.

Beamsplitting device 702 provides beams 708, 710, 712, and 714 to delay component 704. Preferably, delay component 704 differentially delays each of the beams and then provides the beams to array 716. More specifically, each of the beams is detected by a photodetector of array 716 and is converted to a corresponding output electrical component. The output electrical components are received by scaling components, e.g., amplifiers, 718, 720, 722 and 724, respectively. Each of the scaling components electrically scales a corresponding one of the output electrical components to provide a predetermined attenuation to each of the output electrical components. Attenuation typically differs among the output electrical components. In particular, at least one of the output electrical components is scaled relative to the others.

After selective attenuation by the scaling components, a summing component 726, e.g., an amplifier, receives the scaled output electrical components and then provides an output electrical signal 728 that corresponds to the input optical signal. Note, selection of appropriate delays and attenuations can be made in a conventional manner.

Various beamsplitting devices may be used to split an input optical signal into multiple beams. In some embodiments, such as embodiments using one or more combination reflective-refractive elements, at least a portion of the delay to be provided to each beam also can be provided by the beamsplitting device. For instance, a combination reflective-refractive element can provide different path lengths along which each of the multiple beams propagate. Since the propagation velocity of light through the material of a combination reflective-refractive element is slower than the propagation velocity of light through free-space, an increased path length provides a corresponding increase in delay of the beam propagating along that path.

Diffractive optical elements ("DOE") also can be used in some embodiments to split input optical signals into multiple beams. A DOE uses interference and the wave property of light to split the input optical signal. Due to the potentially different path lengths associated with a DOE, delay also can be applied to one or more of the split beams by the DOE.

Various delay components also may be used to delay one or more of the multiple beams split from an input optical signal. For example, delay can be achieved through free-space path delays in some embodiments. When using free-space path delays, the distance necessary to incorporate one bit period of delay in a beam decreases proportionally as signal bit rates increase. For example, at 10 gbd the symbol rate is 100 ps. Thus, a corresponding delay can be achieved by providing a path length difference of 3 cm. The required free-space path delay can be physically shortened by using media other than air. Moreover, beam folding techniques also can be utilized to shorten the required distance. For instance, in the 10 gbd example, the required length can be reduced to under 1 cm if the optical path includes one reflective fold and is contained within a typical transparent plastic media.

Figure 8:
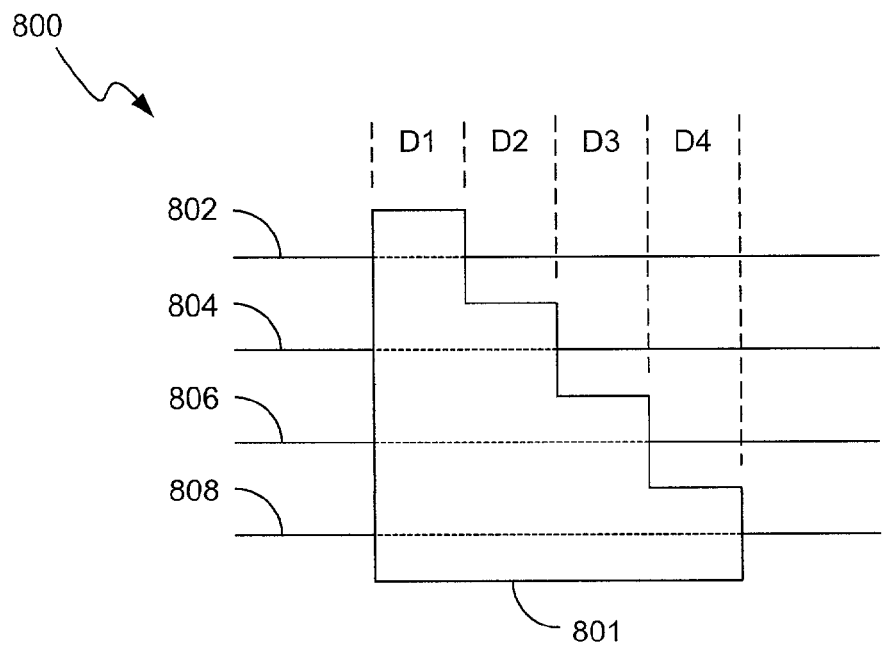
FIG. 8 is a schematic diagram depicting an embodiment of a delay component that can be used in the equalization system of FIG. 3.

In some embodiments, the optical path can be defined, at least in part, by an optically transparent material with a velocity of propagation slower than that of freespace. In this regard, a representative embodiment of such a delay component is depicted schematically in FIG. 8. As shown in FIG. 8, delay component 800 includes a delay element 801 that is configured to receive multiple beams, e.g., beams 802, 804, 806, and 808. As element 801 exhibits a refractive index greater than one, beams having longer propagation paths through the element are delayed longer than beams having shorter propagation paths. Thus, beam 808 is delayed longer than 806, beam 806 is delayed longer beam 804, and beam 804 is delayed longer than beam 802.

It should be noted that delay component 800 can be configured so as to accommodate various numbers of beams other than the number depicted. Additionally, as it may be desired in some embodiments to provide a reference beam that is not delayed, delay component 800 can be configured to accommodate propagation of one or more beams without providing a corresponding delay to that beam(s).

Figure 9:
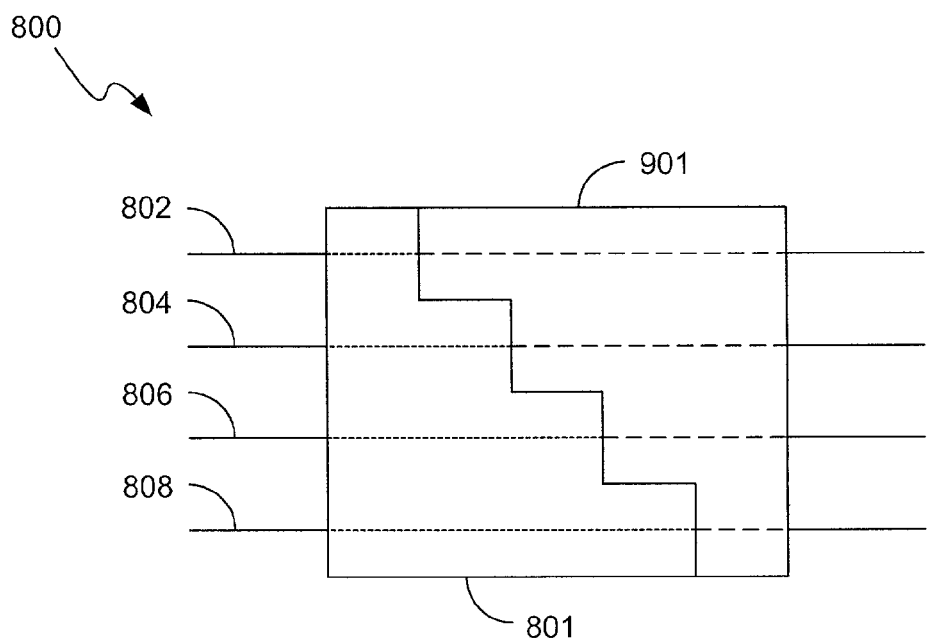
FIG. 9 is a schematic diagram depicting another embodiment of a delay component that can be used in the equalization system of FIG. 3.

An alternative embodiment of a delay component is depicted in FIG. 9. In FIG. 9, delay component 800 includes a first delay element 801 and a second delay element 901. Preferably, each element has a refractive index of greater than one (1), with the refractive index of the first element preferably being greater than the refractive index of the second element. It should be noted that an increase in delay of a particular beam may be provided by lengthening the path and/or by increasing the index of refraction of one or more materials of the delay component.

Multiple element embodiments of the delay component, such as delay component 800, may be considered mechanically advantageous. In particular, alignment of the component in an optical system may be more convenient, compared to aligning an embodiment such as that depicted in FIG. 8. More specifically, the exterior surfaces of the delay component may be configured to engage corresponding alignment surfaces of the optical system.

Figure 10:
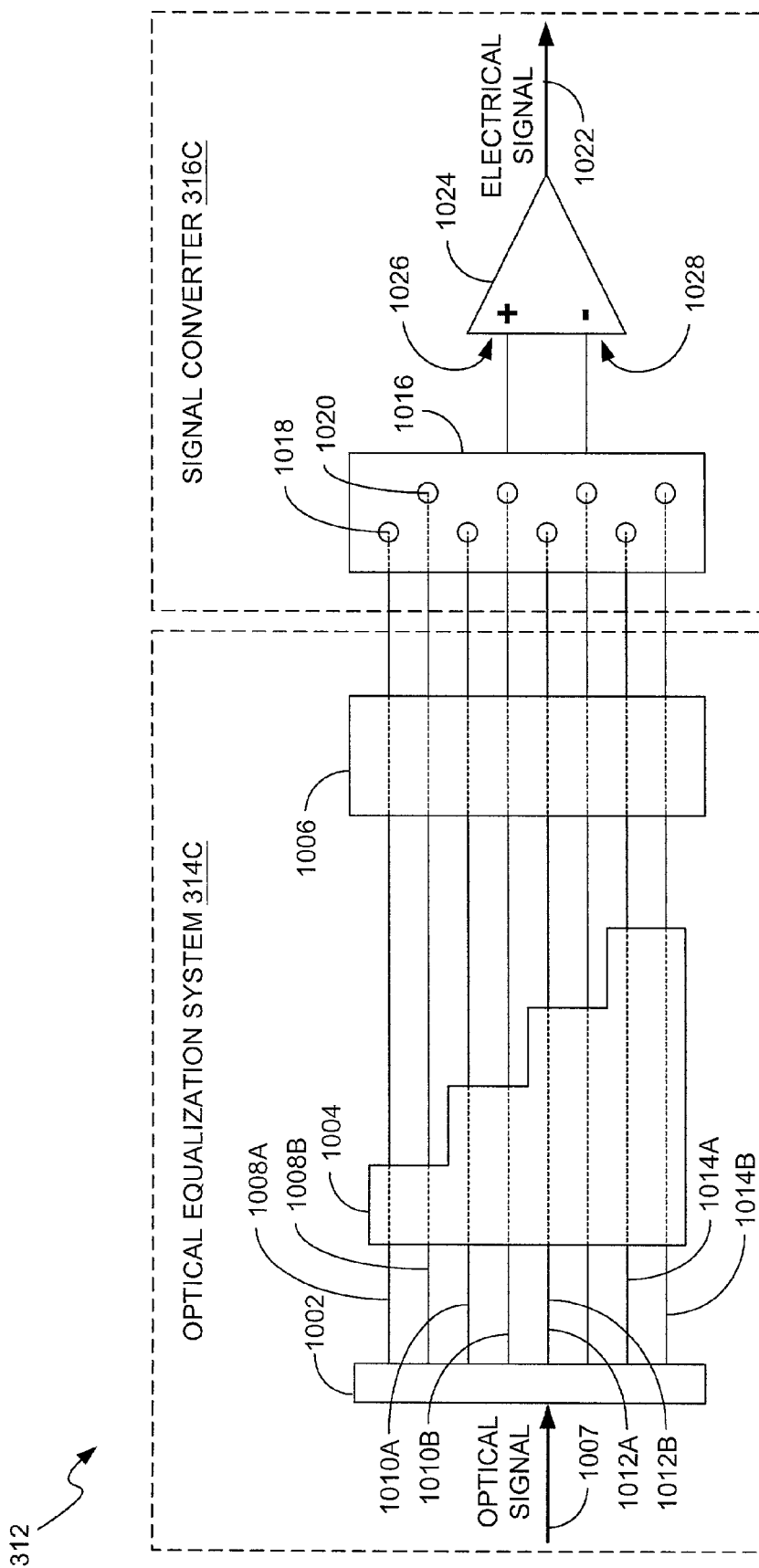
FIG. 10 is a schematic diagram depicting another embodiment of the equalization system of FIG. 3.

A third embodiment of the equalization system 312 is depicted in FIG. 10. In FIG. 10, equalization system 312 includes an optical equalization system 314C and a signal converter 316C. The optical equalization system 314C includes a beamsplitting device 1002, a delay component 1004, and an attenuator 1006. An input optical signal, represented by arrow 1007, is provided to beamsplitting device 1002. In response to the input optical signal, beamsplitting device 1002 produces pairs of beams, e.g., pairs 1008A, 1008B, 1010A, 1010B, 1012A, 1012B, and 1014A, 1014B. Each of the pairs of beams is provided to and differentially delayed by delay component 1004. Preferably, delay component 1004 provides an equivalent, predetermined delay to each beam of a pair of beams. The pairs of beams then are provided to attenuator 1006, which optically scales at least one of the beams. In the embodiment of FIG. 10, attenuator 1006 is configured to provide a fixed attenuation to each of the beams. In other embodiments, however, a control system may be used to impart a controlled attenuation to each beam.

After attenuation, each beam is provided to and detected by a photodetector of array 1016. More specifically, the array 1016 includes pairs of detectors, with each pair including a detector 1018 and a detector 1020. Each detector 1018 is configured to receive light from the attenuator corresponding to a first or "A" beam of a beam pair. Each detector 1020 is configured to receive light corresponding to a second or "B" beam of a beam pair. Each pair of detectors 1018, 1020 differentially detects a corresponding pair of beams and produces corresponding pairs of output electrical components. Since the attenuator is only able to provide gains of 0 to +1, the combination of selective attenuation by the attenuator and differential detection by the signal converter 316C is able to provide coefficients of −1 to +1. More specifically, when the differential detection function is defined as beam "A" minus beam "B," a coefficient of +1 can be achieved by not attenuating beam "A" and fully attenuating beam "B," i.e., 1−0=+1. A coefficient of −1 can be achieved by fully attenuating beam "A" and not attenuating beam "B," i.e., 0−1=−1. A coefficient of 0 is provided by attenuating beam "A" in a manner equal to the attenuation applied to beam "B," e.g., 1−1=0.

An output electrical signal 1022 corresponding to the input optical signal is produced by amplifier 1024. In particular, electrical components output by the photodetector array representing positive coefficients can be provided to input 1026 of the amplifier and electrical components output by the photodetector array representing negative coefficients can be provided to input 1028.

It should be noted that, due to attenuation losses of the attenuator, the receiver sensitivity provided by the embodiment of FIG. 10 potentially is reduced compared to embodiments that do not use an attenuator. A fourth embodiment that does not use an attenuator is depicted in FIG. 11.

Figure 11:
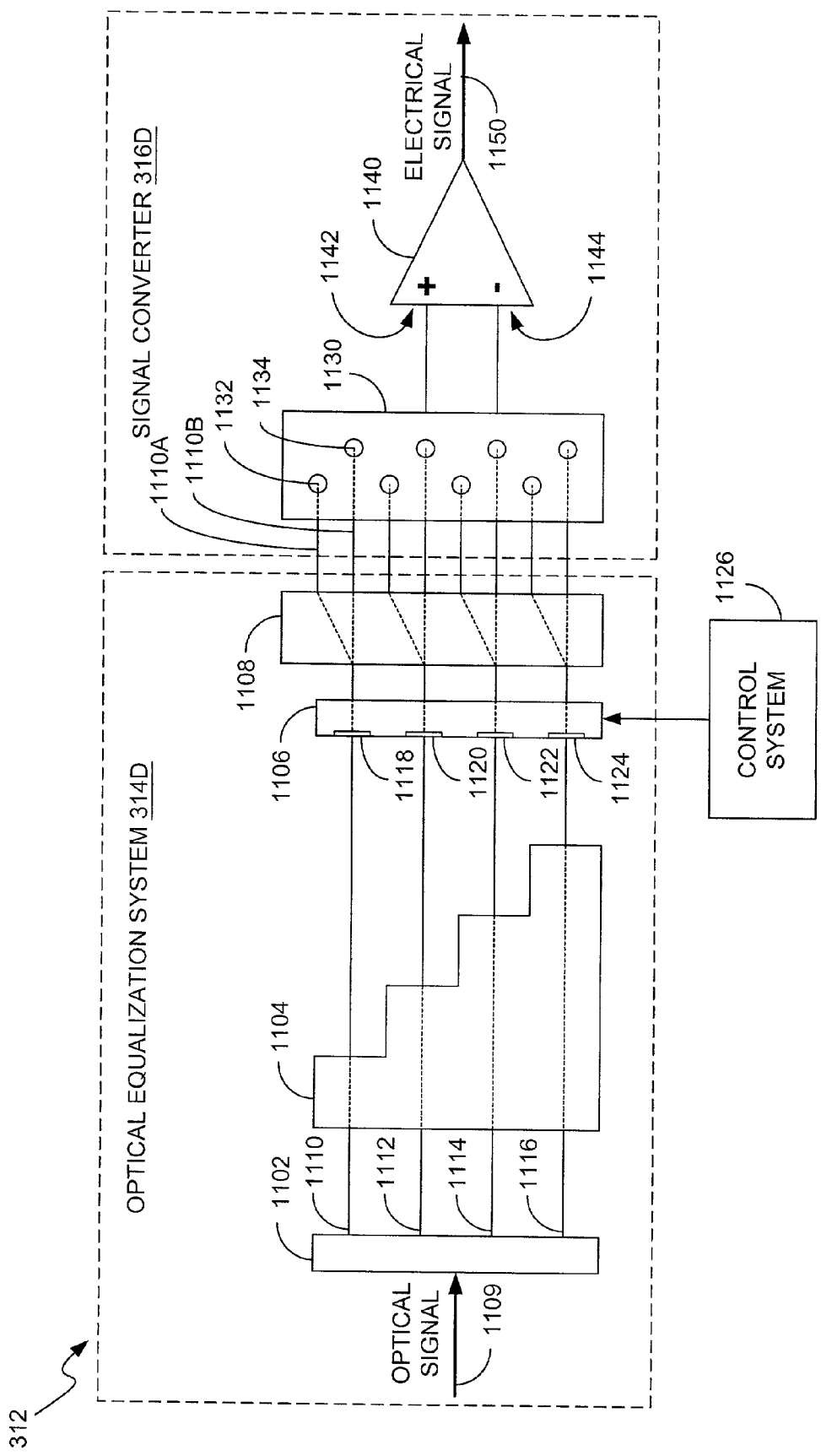
FIG. 11 is a schematic diagram depicting still another embodiment of the equalization system of FIG. 3.

In FIG. 11, equalization system 512 includes a beamsplitting device 1102, a delay component 1104, a birefringent component 1106 and a walk-off crystal 1108. An input optical signal, represented by arrow 1109, is provided to beamsplitting device 1102. In response to the optical signal, beamsplitting device 1102 produces beams 1110, 1112, 1114, and 1116, which are provided to delay component 1004. Each of the beams is differentially delayed by delay component 1004, with a predetermined delay being provided to each beam. Birefringent component 1106, which preferably includes an array of birefringent liquid crystal cells, receives the delayed beams. The liquid crystal cells, e.g., cells 1118, 1120, 1122 and 1124, are adapted to impart an individually controllable rotation of the polarization plane upon each beam. Control of the rotation of the polarization plane preferably is provided by a control system 1126. However, in some embodiments, a control system may not be used as the rotation of the polarization plane imparted upon each beam can be predetermined.

After a predetermined rotation has been imparted upon each beam, the walkoff crystal splits each of the beams into a pair of beams, e.g., beam 1110 is split into beams 1110A and 1110B. The relative intensity of each beam within each pair is determined by the rotation of polarization imparted on the beam by the birefringent component 1106, therefore, the birefringent component optically scales the beams. Each beam is then detected by an array 1130 of photodetectors. More specifically, the array 1130 includes pairs of detectors, with each pair including a first detector 1132 and a second detector 1134. The first detectors 1132 are positioned to receive light from the walk-off crystal resulting from no rotation of polarization by the birefringent component. Thus, the detectors 1132 correspond to a scaling coefficient of +1. The second detectors 1134 are positioned to receive light from the walk-off crystal resulting from 90° rotation of polarization by the birefringent component. Thus, the detectors 1134 correspond to a coefficient of −1. The first and second detectors produce output electrical components that are differentially detected by amplifier 1140. In particular, each pair of beams is converted to an electrical component that is differentially detected by the amplifier. For instance, the electrical components output by the photodetectors representing positive coefficients can be provided to input 1142 of the amplifier and the electrical components output by the photodetectors representing negative coefficients can be provided to input 1144. The amplifier then provides an electrical output signal 1150 that corresponds to the input optical signal.

Control systems of the invention, such as control system 1126, for example, can be implemented in software, firmware, hardware, or a combination thereof. When implemented in hardware, the control system can be implemented with any or a combination of various technologies. By way of example, the following technologies, which are each well known in the art, can be used: a discrete logic circuit(s) having logic gates for implementing logic functions upon data signals, an application specific integrated circuit (ASIC) having appropriate combinational logic gates, a programmable gate array(s) (PGA), and a field programmable gate array (FPGA).

In alternative embodiments, the control system 1126 can be implemented in software as an executable program. Such a control system can be executed by a special or general purpose digital computer.

Regardless of the particular configuration used to implement the control system, the control system is adapted to analyze an input optical signal. The control system determines what coefficients can be used by the equalization system to make the pulses of the optical signal more closely approach an ideal shape. Algorithms for implementing such a control scheme are widely known in the art and are commonly referred to as adaptive equalization algorithms. Control system 1126 may use one or more of a variety of such algorithms to tune the equalization system of the invention. For instance, the control system could use the Least Mean Squares (LMS) algorithm. When using this algorithm, the equalization system is tuned to minimize the mean square error between the received pulse and an "expected" pulse. *Adaptive Filters, Structures, Algorithms and Applications* by Michael L. Honig and David G. Messerschmitt, for example, describes the LMS algorithm.

If a control system is not to be implemented in an equalization system, an example of which is depicted in the embodiment of FIG. 10, the equalization system can function as a fixed equalizer. In these embodiments, components that provide predetermined delays and/or attenuations can be used.

Figure 12:
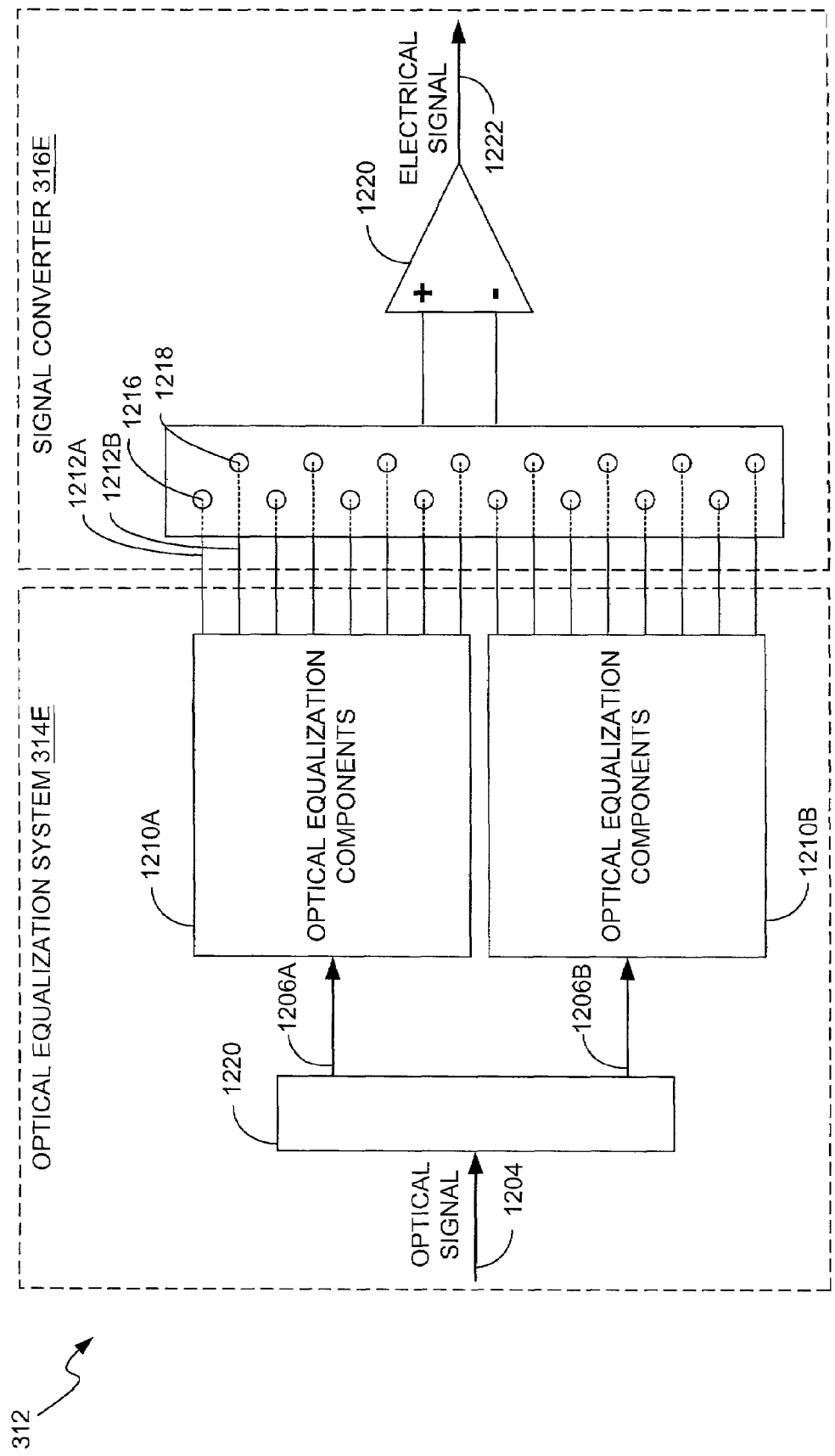
FIG. 12 is a schematic diagram depicting yet another embodiment of the equalization system of FIG. 3.

Reference is now be made to FIG. 12, which depicts a fifth embodiment of the equalization system 312. As will be described below, the embodiment of FIG. 12 can be used to equalize an input optical signal when the polarization of the input optical signal is not known.

In FIG. 12, equalization system 312 includes an optical equalization system 314E and a signal converter 316E. Optical equalization system 314E incorporates a polarization splitter 1202 that is adapted to receive an input optical signal 1204. The polarization splitter 1202 receives input optical signal 1204 and produces two output beams 1206A and 1206B, respectively. Each of the output beams exhibits a different plane of polarization with respect to the other. The output beams are provided to optical equalization components. More specifically, output beam 1206A is provided to first optical equalization components 1210A and output beam 1206B is provided to second optical equalization components 1210B.

Each of the optical equalization components includes a beamsplitting device, a delay component, a birefringent component and a walk-off crystal (none of which are depicted in FIG. 12). These components were described before in relation to FIG. 11 and will not be described in detail here. Generally, however, each of the optical equalization components receives a corresponding output beam (1206A, 1206B) and then provides pairs of beams 1212A, 1212B to an array 1214 of photodetectors. More specifically, the array 1214 includes pairs of detectors, with each pair including a first detector 1216 and a second detector 1218. The first detectors 1216 are positioned to receive light from the optical equalization components resulting from no rotation of polarization, and the second detectors 1218 are positioned to receive light from the optical equalization components resulting from 90° rotation of polarization. The first and second detectors produce output electrical components that are differentially detected by amplifier 1220. The amplifier then provides an electrical output signal 1222 that corresponds to the input optical signal.

Note, control of the rotation of the polarization plane preferably is provided by a control system, e.g., control system 1126 of FIG. 11. However, in some embodiments, a control system may not be used as the rotation of the polarization plane imparted upon each beam can be predetermined.

The foregoing description has been presented for purposes of illustration and description. It is not intended to be exhaustive or to limit the invention to the precise forms disclosed. Modifications or variations are possible in light of the above teachings. The embodiment or embodiments discussed, however, were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims.

The invention claimed is:

1. A system for performing time-domain equalization, the system comprising:
   a beamsplitter configured to split a first optical signal comprising a light pulse into a plurality of beams;
   a delay component optically coupled to the beamsplitter, the delay component configured to generate a delayed first beam by providing a first delay to a first beam in the plurality of beams and generate a delayed second beam by providing a second delay to a second beam in the plurality of beams;
   a birefringent component configured to receive the delayed first beam and the delayed second beam from the delay component and operable to optically scale the delayed first and second beams by providing a first rotation of a polarization plane of the first beam and a second rotation of a polarization plane of the second beam;
   a walk-off crystal configured to split each of the optically scaled first and second beams into a first and a second pair of beams;
   an array of photodetectors comprising a first and a second pair of photodetectors configured to receive the first and the second pair of beams respectively and generate therefrom a first and a second electrical component of an electrical signal that corresponds to the input optical signal after time-domain equalization; and
   a control system configured to control the birefringent component for optically scaling the delayed first and second beams, wherein the control system generates coefficients used to perform time-domain equalization for approximating an ideal pulse shape.

2. The system of claim 1, wherein the control system further uses an algorithm to minimize a mean square error between the light pulse and an idealized light pulse.

3. The system of claim 1, wherein the birefringent component comprises an array of liquid crystal cells.

4. The system of claim 1, wherein the first rotation determines the intensity of the optically scaled first beam and the second rotation determines the intensity of the optically scaled second beam.

5. The system of claim 1, further comprising:
   a polarization splitter configured to receive an input optical signal and split the input optical signal into the first optical signal and a second optical signal.

6. The system of claim 5, wherein the first optical signal has a first plane of polarization and the second optical signal has a second plane of polarization, the first plane of polarization being different than the second plane of polarization.

7. A method for performing time-domain equalization, the method comprising:
   splitting a first optical signal comprising a light pulse into a plurality of beams;
   optically delaying a first beam and a second beam in the plurality of beams;
   optically scaling the delayed first and second beams by providing a first rotation of a polarization plane of the delayed first beam and a second rotation of a polarization plane of the delayed second beam;
   transmitting the optically scaled first and second beams through a walk-off crystal to produce a first and a second pair of beams respectively;
   using an array of photodetectors to generate from the first and second pair of beams a first and a second electrical component respectively of an electrical signal that corresponds to the input optical signal after time-domain equalization; and
   using an algorithm containing coefficients to minimize a mean square error between the light pulse and an idealized light pulse.

8. The method of claim 7, wherein providing the first and second rotation comprises:
   providing an array of birefringent liquid crystal cells;
   transmitting the delayed first and second beams through the array of birefringent liquid crystal cells; and
   controlling the array of birefringent liquid crystal cells to provide the first and second rotation.

9. The method of claim 7, wherein providing the first and second rotation comprises:
   predetermining the first and second rotation.

10. The method of claim 7, wherein rotating the polarization plane of the delayed first beam comprises:
    providing a control system adapted to analyze the first optical signal and to determine coefficients used for rotating the polarization plane of the delayed first beam.

11. A system for performing time-domain equalization, the system comprising:
    a beamsplitter configured to split a first optical signal comprising a light pulse into a plurality of beams;
    a delay component optically coupled to the beamsplitter, the delay component configured to generate a delayed first beam by providing a first delay to a first beam in the plurality of beams; generate a delayed second beam by providing a second delay to a second beam in the plurality of beams; and generate a delayed third beam by providing a third delay to a third beam in the plurality of beams;
    a birefringent component configured to receive the delayed first beam, the delayed second beam, and the delayed third beam from the delay component and operable to use a first scaling coefficient to set the delayed first beam to a first intensity; to use a second scaling coefficient to set the delayed second beam to a second intensity; and to use a third scaling coefficient to set the delayed third beam to a third intensity;
    a walk-off crystal configured to receive the delayed first beam of the first intensity and split the delayed first beam into a first pair of beams; to receive the delayed second beam of the second intensity and split the delayed second beam into a second pair of beams; and to receive the delayed third beam of the third intensity and split the delayed third beam into a third pair of beams; and
    an array of photodetectors comprising a first, a second, and a third pair of photodetectors configured to receive the first, the second, and the third pair of beams respectively and generate therefrom a first, a second, and a third electrical component of an electrical signal that corresponds to the input optical signal after time-domain equalization.

12. The system of claim 11, wherein setting the delayed first beam to the first intensity comprises a first rotation of a polarization plane of the delayed first beam and setting the delayed second beam to the second intensity comprises a second rotation of a polarization plane of the delayed second beam, the first rotation different than the second rotation.

13. The system of claim 11, wherein the first and second scaling coefficients are individually equal to one of a) +1, b) −1, and c) 0.

14. The system of claim 11, wherein the birefringent component is an array of liquid crystal cells and the first and second intensities are set by controlling the array of liquid crystal cells.

15. The system of claim 11, further comprising:
    a control system configured to analyze the first optical signal and determine therefrom the first, second, and third scaling coefficients.

16. The system of claim 11, further comprising:
    a control system configured to analyze the first optical signal and determine therefrom the first and second scaling coefficients.

17. The system of claim 16, wherein the control system is configured to use an adaptive equalization algorithm to determine the first and second scaling coefficients.

* * * * *